Feb. 26, 1952 W. B. WHITNEY 2,587,260
APPARATUS FOR MOLECULAR DISTILLATION
Filed May 27, 1948 2 SHEETS—SHEET 1
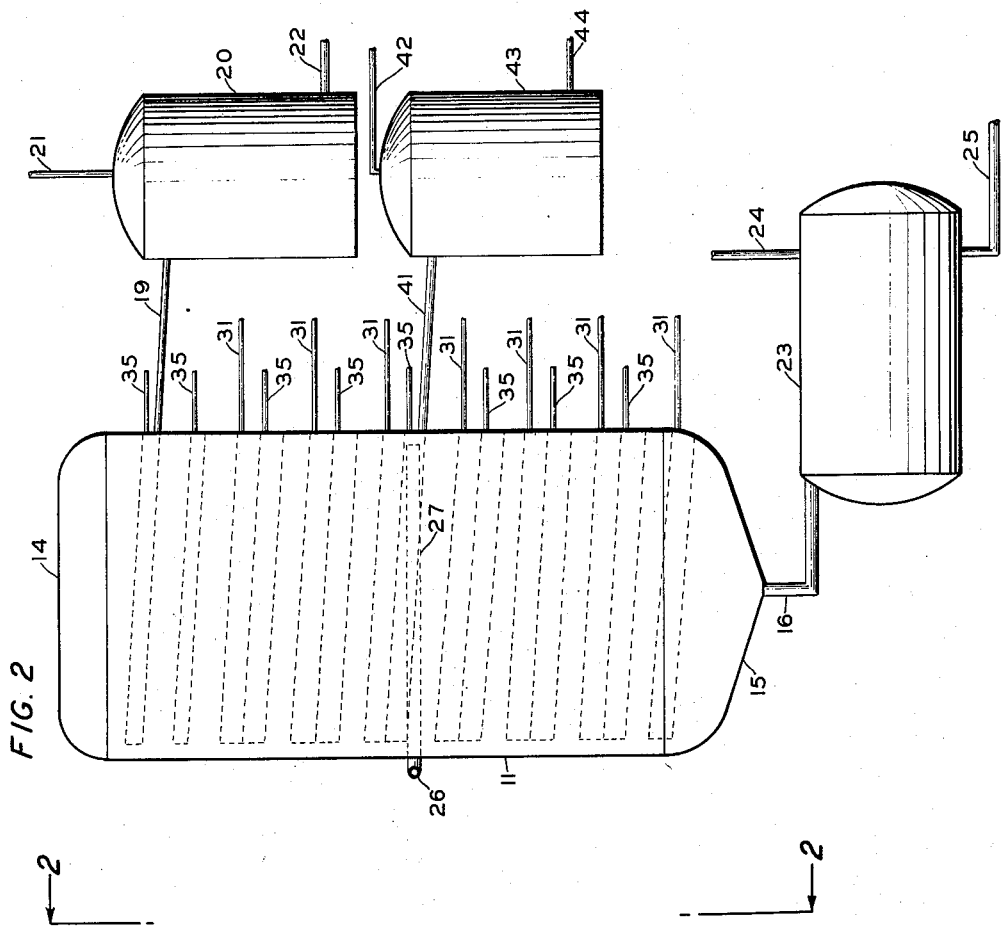
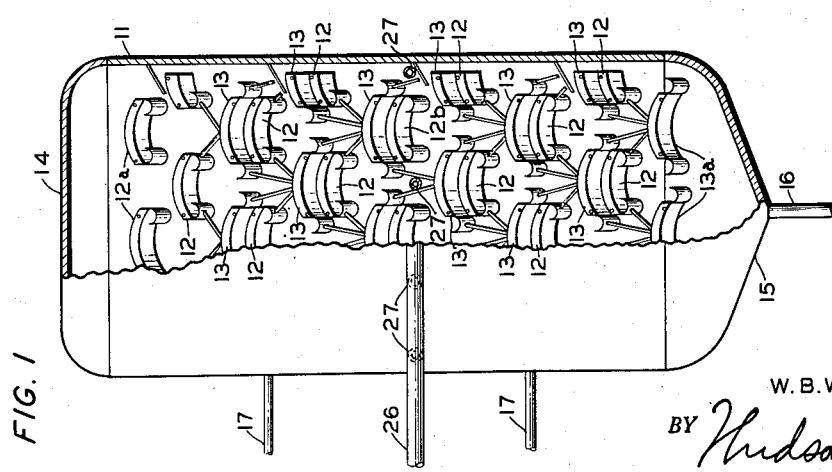
INVENTOR.
W. B. WHITNEY
BY *Hudson & Young*
ATTORNEYS Feb. 26, 1952 — W. B. WHITNEY — 2,587,260

APPARATUS FOR MOLECULAR DISTILLATION

Filed May 27, 1948 — 2 SHEETS—SHEET 2

*INVENTOR.*
W. B. WHITNEY
BY *Hudson & Young*
ATTORNEYS

Patented Feb. 26, 1952

2,587,260

UNITED STATES PATENT OFFICE 2,587,260

APPARATUS FOR MOLECULAR DISTILLATION

William B. Whitney, Bartlesville, Okla., assignor to Phillips Petroleum Company, a corporation of Delaware Application May 27, 1948, Serial No. 29,639

3 Claims. (Cl. 202—205)

This invention relates to distillation apparatus for use under high vacuum. In one of its more specific aspects it relates to a method for carrying out high vacuum distillation of difficultly distillable materials. In a still more specific aspect it relates to a method for distilling difficultly distillable materials under high vacuum and an apparatus in which to carry out the process.

Molecular or short-path distillation consists of heating a liquid, usually spread in a thin film or layer, which has in close proximity to the surface of said liquid a cooler condensing surface and in which the intervening space is evacuated to such a degree that the mean free path of the evaporating molecules is greater than the distance between the surface of the evaporating material and the condenser. The reduced pressure necessary to make the mean free path of sufficient magnitude to be useful in distillation is from $1 \times 10^{-3}$ to $1 \times 10^{-4}$ mm. of mercury.

While the requirements for molecular distillation are simple and simple equipment has been devised to carry out successfully molecular distillation, these prior art procedures are satisfactory only for extremely small-scale use. The problems of continually renewing the surface film, collecting successive fractions, controlling the temperatures of the evaporating and condensing sections, and maintaining a sufficiently reduced pressure all require quite complicated equipment when molecular distillation on a larger scale is attempted. One of the early forms of molecular distillation equipment was the simple pot still, which was followed by the falling-film still and later by the rotating-disk still. In the latter still, the distilland is placed in the center of a rapidly revolving disk, and the liquid is spread in a thin film as it moves to the edge of the heated disk, and during the time of its passage over the disk a portion is evaporated. This type of still has had extensive commercial use in the separation of fish oils into various fractions in some of which are concentrated certain vitamin or provitamin-type compounds which were present in the original oil. This production of vitamin concentrates from materials which are non-distillable by means other than molecular distillation has been of extreme importance. The reason molecular distillation on a commercial scale up to the present has been limited substantially to the production of vitamin concentrates has been due to the high cost of the process making it available only for high-priced products. As valuable as this method has been, it still is tedious, for, if several fractions are desired, the material must be run through the stills several times, as only one vaporized and one residual product are obtained in each pass through the still. The fractionation efficiency is also very low, being of necessity no more than one theoretical plate and, in practice, often much less.

An object of my invention is to devise a process for carrying out a distillation operation under high vacuum. Another object of my invention is to provide an apparatus in which to carry out a distillation operation under high vacuum. Still another object of my invention is to provide an apparatus in which to carry out a distillation of difficultly distillable materials under high vacuum. Still another object of my invention is to provide an apparatus in which multi-stage separation under high vacuum may be carried out in one operation and in one apparatus. Yet another object of my invention is to provide an apparatus for carrying out the molecular distillation process herein disclosed, which apparatus has no moving parts. Other objects and advantages will be obvious to those skilled in the art upon reading the following disclosure, which, taken with the accompanying drawing, forms a part of this specification.

In the drawing, Figure 1 is a front elevational view of my apparatus with a portion of the front wall removed.

Figure 2 is a side elevational view of the apparatus of Figure 1, looking in the direction 2—2.

Figure 3:
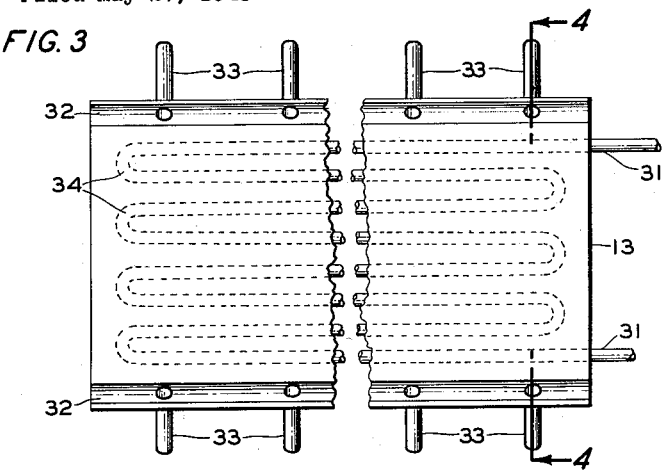
Figure 3 is a plan view of one piece of apparatus shown in Figure 1.

My invention comprises the improvement in molecular distillation obtained by arranging a series of evaporator-condenser pairs so positioned that the residue from an evaporator and the condensate from the adjacent condenser are fed to the evaporator below by gravity, permitting repeated vaporization and condensation and resulting in a greatly improved degree of separation. In addition, said positioning permits a portion of the volatilized material to bypass the closest condenser and progress upwardly toward a more distant condenser, thus moving to the upper portion of the distillation chamber in steps as repeated vaporization takes place, during which time the condensed vapors are repeatedly contacted with residual material progressively descending from evaporators and condensers overhead. This produces a process in which molecular distillation approximately approaches the process of rectification in a bubble tower adapted for distillation under equilibrium distillation conditions. There are still great differences, however, as heat is added and abstracted throughout the series of evaporators and condensers in the chamber, and while the condensate and residue from the "plates" above are combined before being revaporized, they do not approach equilibrium between vapor and liquid; for, by definition of molecular distillation, vapor is almost nonexistent in the system, and what vapor is present is not in equilibrium with the liquid. However, the liquid on each evaporator is substantially a close-cut fraction, and the volatile product produced by each evaporator during a given vaporization at a given operating temperature will have definite characteristics.

Modifications and adaptations of the process to suit special conditions will be apparent to those skilled in the art. The apparatus and process for molecular distillation will be clearly understood from the following description in conjunction with the accompanying drawings.

A preferred embodiment of my invention is illustrated in Figure 1. A vessel 11 adapted to withstand a high vacuum may be square or rectangular in shape, preferably with rounded corners and edges for added strength. In the vessel 11 are arranged a plurality of condenser plate-evaporator plate assemblies. The condenser plates are illustrated by condensers 12, 12a and 12b, while the evaporators are illustrated by evaporators 13 and 13a. An evaporator-condenser pair may be considered as any evaporator plate with the condenser plate directly above.

In molecular distillation, the evaporation on a statistical average ordinarily takes place at right angles to the surface on which is the film of liquid being evaporated. I have shown, diagrammatically in Figure 1, a front elevation of my apparatus with a portion of the front wall removed. In the vessel as shown, there may be arranged two top rows of condenser plates 12 and 12a above which there are no evaporator plates. Below the row of these condenser plates 12 is the first row of evaporator plates 13. Immediately beneath this first row of evaporator plates is a third row of condenser plates, and below, but in staggered relation, is a second row of evaporator plates. In the bottom of the vessel is a row of evaporator plates 13a. The evaporator and condenser plates are, in general, elongated plates as may be seen by reference to Figures 3 and 6, which illustrate one embodiment, respectively, of an evaporator plate and a condenser plate. Longitudinally, these evaporator and condenser plates may be arranged horizontally in the vessel 11, or, preferably, they may be arranged with a slight slope. This small amount of slope is intended to assist liquid accumulating in drains 32 and 36 to flow in a general direction toward one end wall. For transfer of unevaporated liquid from one evaporator plate to the next lower evaporator plate, there is provided a series of downspouts 33 which are in liquid communication with the drains 32, and these spouts 33 deliver this unevaporated liquid from one evaporator plate to the center of the next lower evaporator plate. In addition, spouts 37 are in liquid communication with the drains 36 attached to the condenser plates 12. Condensate accumulating on the underside of the condenser plates 12 collects in the drains 36 and then flows downgrade and is permitted to flow through a spout 37 onto the surface of the next lower, but staggered, evaporator plate. The spouts 33 from one evaporator plate and the spouts 37 from the adjacent condenser plate conduit, respectively, unevaporated liquid and condensed liquid to the top surface of a lower evaporator plate. The evaporator plates of the bottom row of plates may not be equipped with the drains similar to drains 32 of the plates 13, since unevaporated liquid from these lower plates may merely drip off the edges and accumulate in the bottom 15 of the vessel. Pipe 16 is provided for withdrawal of this bottom unevaporated product from the vessel 11 and transfer into an accumulator tank 23.

The upper row of condenser plates 12a is provided with the side drains 36, and these side drains do not have the downspouts, as do other condenser plates in the vessel. In the absence of the downspouts, condensate accumulating in these drains 36 then flows to the low end of the condenser plate. A conduit 19 is provided in the side wall of the vessel 11, and the drains 36 conduct condensate from the condensers to this conduit 19, through which condensate passes into an accumulator vessel 20. The condenser plates 12 of the second row from the top are also equipped with drains 36 and have spouts 37, and condensate from these drains flows by gravity through the spouts to the top row of evaporator plates 13.

In the embodiment shown, a horizontal row of condenser plates 12b are constructed in exactly the same manner as the top row of condenser plates 12a in that these condenser plates are provided with drains 36 without spouts. Condensate then accumulating on the underside of these condensers 12b flows down the drains and is removed through a side conduit 41 and passed into an accumulator vessel 43. The evaporator plates immediately above this row of condenser plates 12b are equipped with the side drains 32 and downspouts 33 for transfer of unevaporated liquid to the next lower row of evaporator plates.

A pipe 26 may serve as a feed pipe for passage of liquid to be evaporated from a source not shown in my apparatus. To this pipe is manifolded a number of side arms 27 which lead through the front wall of the vessel 11, and each of these tubes 27 extends longitudinally above the center of an evaporator plate. These tubes 27 within the vessel 11 are perforated and serve as feed pipes for introduction of liquid to be evaporated onto a horizontal row of evaporator plates.

Some side connections 17 of the vessel 11 are provided for connection to diffusion and backing pumps for evacuation. The accumulator vessels 20, 23 and 43 are provided, respectively, with connections 21, 24 and 42 for evacuation. Connections 22, 25 and 44 are provided for withdrawal of liquid products from the respective accumulators. Accumulators 20, 23 and 43 and/or conduits 19, 41, and 16 may be provided with suitable cooling means, not shown, to prevent loss of collected fractions by evaporation.

Figure 4:
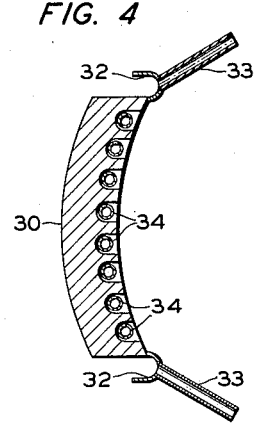
Figure 4 is a cross-sectional view of the apparatus shown in Figure 3 and taken on the line 4—4.
Figure 5:
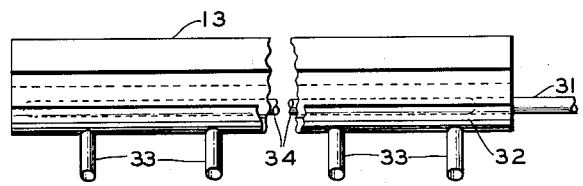
Figure 5 is a side elevational view of the apparatus shown in Figure 3.

Figures 3, 4 and 5 illustrate several views of an evaporator plate. The plate may be an elongated plate in which is embedded conduit 34, the ends of which are connected to conduits 31 for receiving and discharging a heating fluid. However, if desired, heating by electricity in place of heating with a fluid may be used, and, in this case, conduit 34 will be an electrical heating element to which is then fastened lead wires 31.

In Figure 4 is shown the side drains 32 into which unevaporated liquid from the evaporating surface 30 may accumulate. This figure is a cross-sectional view of the evaporator taken on the line 4—4 of Figure 3, and it accordingly shows the positioning of the downspouts 33. Any desired number of downspouts 33 may be used, depending upon the volume of liquid to be treated on each evaporator. Figure 5 shows this evaporator plate in side elevation.

Figure 6:
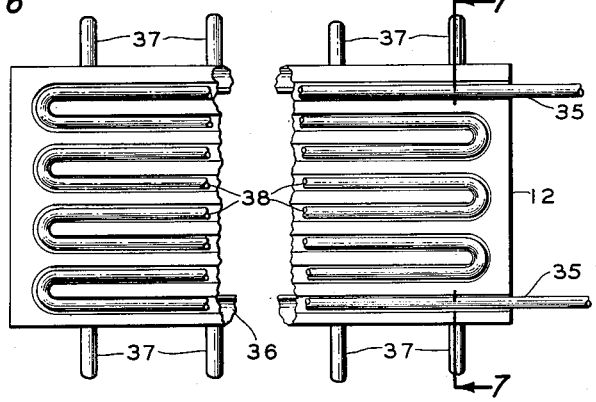
Figure 6 is a plan view of another piece of apparatus shown in Figure 1.
Figure 7:
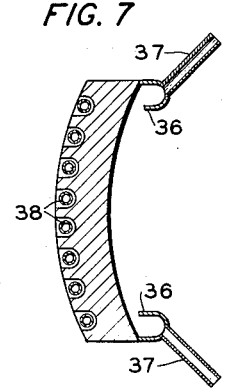
Figure 7 is a cross-sectional view of the apparatus shown in Figure 6 and taken on the line 7—7.
Figure 8:
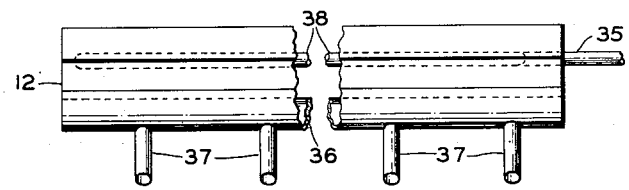
Figure 8 is a side elevational view of the apparatus shown in Figure 6.

Figures 6, 7 and 8 show similar views of a condenser plate. This plate is provided with a conduit 38, the ends of which are connected with tubes 35 for passage of cooling fluid into and out of the coil 38. In Figure 7 may be seen the exact positioning of the drains 36 under the condenser plates. The positioning and arrangement of the downspouts 37 are also shown in this figure. Any number of downspouts 37 may be used on the condenser plates as indicated by capacity or other variables. The conduits 31 of the evaporator plates and the conduits 35 of the condenser plates pass through the wall of the vessel 11, and outside the vessel these conduits may be manifolded into separate conduits, not shown, for passage of cooling fluid into and out of the vessel and for passage of heating fluid into and out of the vessel; or, in case elements 34 are electrical heating elements, then conduits 31 with connecting lines may be wires of proper construction for electrical connections. In one modification, condensers 12 and evaporators 13 may be horizontal, and drains 36 and 32 may have a slightly zigzag or undulate elevational pattern, downspouts 37 and 33 being attached at the lowest points of each drain.

In the operation of the process of my invention using the apparatus herein disclosed, degassed distilland from a source, not shown, is conducted through pipe 26 and is passed through the manifolded feed pipes 27 and distributed onto the top of at least one row of evaporator plates 13. The chamber, of course, has previously been evacuated. Material evaporated from a given evaporator plate 13 then passes vertically and impinges against the underside of the condenser plate 12 immediately or directly above. Upon condensation of a sufficient amount of material on the under surface of a condenser plate, condensate will flow to the right and to the left into drains 36. From these drains 36, condensate will flow through the downspouts 37 onto the surface of evaporator plates next higher above the feed plates. From these evaporator plates, material, on evaporation, will pass vertically to higher condenser plates, and, upon condensation, condensate will flow into the drain or the underside of these plates and will ultimately be delivered to the surface of a third and still higher row of evaporator plates. Material evaporated from the top row of evaporator plates will be condensed on the under surface of the top row of condenser plates 12a, and condensate from these surfaces will be conducted through the drains 36 to the withdrawal pipe 19, and this material will be passed into the accumulator 20. The material condensed on this top row of condenser plates and accumulated in this accumulator 20 is one product of the process and may be termed overhead product.

Material added through the feed distribution pipes 27 onto the top surface of the row of evaporators 13 and which does not evaporate will flow by gravity and collect in the drains 32 and this material will ultimately be delivered to the evaporating surface of the next lower series of evaporators through the downspouts 33. From these surfaces material being evaporated will pass upward to condenser surfaces 12b, and material not evaporated will be accordingly delivered through the drains 32 and downspouts 33 to the next lower evaporator plates. In like manner material not evaporated on this row of evaporator plates will be conducted to the surface of the bottom row of evaporator plates 13a. Material not evaporated by these lower evaporator plates will merely drip off the sides and will accumulate in the bottom of the vessel. This material may, if desired, be permitted to flow by gravity through the bottom draw-off line 16 into the accumulator 23. Gravity flow, of course, is possible since the accumulator tank 23 is evacuated to the same extent through pipe 24 as the main vessel 11.

I have provided for the withdrawal of an intermediate product through a side draw conduit 41 into an accumulator tank 43. In order to take off an intermediate product the condenser plates 12b at the desired positioning in the vessel 11 are provided only with the drains 36. This row of plates does not have the downspouts 37 and condensate which accumulates on the bottom surface of these plates 12b is conducted by the drains 36 to the side of the vessel 11 where connection is made with the take-off pipe 41. It will be obvious that any number of side streams or intermediate fractions may be taken from my apparatus, and that the feed may be introduced onto any one or onto a plurality of the evaporator plates.

One of the advantages of my invention as herein disclosed is that there are no moving parts to be rotated or otherwise moved under high vacuum operating conditions. Materials of construction of the vessel 11 may be selected from among those commercially available taking into account, of course, strength to resist pressure differentials under high vacuum conditions. The materials should not, of course, corrode or be attacked in any manner by the material being treated. The condenser and evaporator plates may be constructed of almost any material desired, such as ordinary steel, cast iron, stainless steel, or even ceramic material. The selection of this material for construction may be made upon consideration of the type of stock to be treated and use to which it will be put. The conduits 38 in the condensers may be made of any desired material and these conduits should be positioned in such a manner that the action of the cooling fluid will be efficient, and, in like manner, whether the conduit 34 be tubular for passage of a heating fluid or electrical heating wires, contact with the evaporator plate body should be efficient so that the heating of these plates may be easily controlled. In the general operation of this apparatus, condenser temperatures and evaporator temperatures at the top of the column will be lower than the condenser and evaporator temperatures at lower points in the column. In this manner, the lowest temperature in the column will be at the top row of condenser plates 12a, and the highest temperature in the column will be at the bottom row of evaporator plates 13a. Means for controlling these and intermediate temperatures are necessary, but are not shown, since such equipment is common and its construction and operation are understood by those skilled in the art. It will be obvious that any number of rows of plates desired may be used. The dimensions of the column as to height or cross section may be determined from the point of view of material being treated and of desired capacity. The cross section of the column need not be rectangular or square but may actually be circular. However, construction of the evaporator and condenser plates is a little more tedious for use in a column of circular cross section, since plates in such a column will be of different length, those centrally positioned being the longest and those farthest from the center the shortest. The ends of the plates should conform to the circular shape of the column. While the column may be of circular cross section, the preferred cross section is one of square or rectangular shape, since such shape materially simplifies construction and installation of the condenser and evaporator plates.

I claim:

1. An apparatus for use in the distillation of liquid under high vacuum comprising a fluid-tight vessel, a plurality of pairs of non-rotatable evaporator plates and non-rotatable condenser plates, the condenser plates of each pair of condenser and evaporator plates being positioned vertically above the evaporator plate and is adapted to condense vapors evaporated therefrom, said pairs of evaporator and condenser plates being disposed in vertical succession to form vertical rows of alternate evaporator plates and condenser plates, said pairs of evaporator and condenser plates in a vertical row being staggered vertically with respect to the evaporator and condenser plates in each adjacent vertical row so that vapors from an evaporator plate skips the next higher condenser plate but are condensed on the second higher condenser plate, means for supplying coolant to each condenser plate, means for supplying heat to each evaporator plate, means for collecting condensate by gravity from the condenser plates, conduit means for removing condensate from some condenser plates from the vessel, means for conducting condensate from the remaining condenser plates to evaporator plates in an adjacent row of plates, means for collecting unvaporized liquid from the evaporator plates, means for removing unvaporized liquid from the collecting means of the bottom evaporator plates from the vessel, means for conducting unvaporized liquid from the remaining evaporator plates to an evaporator plate in an adjacent row of plates, this last stated means being so disposed that unvaporized liquid flows from evaporator plates in one vertical row to another in another row in staggered flow relationship, and conduit means for introducing liquid to be evaporated onto the top of some evaporator plates.

2. In the apparatus of claim 1 wherein the conduit means for collecting condensate from the condenser plates and the conduit means for collecting undistilled liquid from the evaporator plates are sloping for gravity flow of liquids therein.

3. An apparatus for use in the distillation of liquids under high vacuum comprising a rectangular, fluid-tight vessel adapted to withstand high vacuum, a plurality of pairs of elongated evaporator plates and elongated condenser plates disposed throughout said vessel as horizontal rows of evaporator plates and horizontal rows of condenser plates, the condenser plates in one horizontal row being positioned directly above the evaporator plates of a second lower horizontal row of evaporator plates in such a manner that vapors from the evaporator plate of one horizontal row of evaporator plates pass upward skipping the condenser plates of the first higher horizontal row of condenser plates and impinging upon the condenser plates of the second higher horizontal row, said elongated plates having a convex upward cross section, tubular means embedded in said condenser plates for passage of fluid coolant therethrough, means for heating said evaporator plates, conduit means disposed along the elongated sides of the condenser plates of a horizontal top row of condenser plates for collecting condensate therefrom and conduit means for removing said condensate from the vessel; conduit means disposed along the elongated sides of the condenser plates of other rows of condenser plates, and further conduit means connected with the last stated conduit means for transferring by gravity condensate from said last stated conduit means to an evaporator plate of a next lower horizontal row of evaporator plates; conduit means disposed along the elongated sides of the evaporator plates of all rows of evaporator plates, still further conduit means in operative communication with all of said last mentioned conduit means excepting those on the bottom row of evaporator plates, said still further conduit means adapted to conduct unevaporated liquid from said last mentioned conduit means to the top surfaces of elongated evaporator plates of the next lower row of evaporator plates in such a manner that vapors from the evaporator plates of one horizontal row of evaporator plates pass upward skipping the condenser plates of the first higher horizontal row of condenser plates and impinging upon the condenser plates of the second higher horizontal row; conduit means for removing unevaporated liquid from the bottom of said vessel and conduit means for introducing liquid to be separated onto the top surface of the elongated evaporator plates of a horizontal row of plates at approximately a mid vertical section of the vessel.

WILLIAM B. WHITNEY.

REFERENCES CITED

The following references are of record in the file of this patent:

UNITED STATES PATENTS

| Number | Name | Date |
|---|---|---|
| 2,117,802 | Hickman | May 17, 1938 |
| 2,137,553 | Vigers et al. | Nov. 22, 1938 |
| 2,218,240 | Hickman | Oct. 15, 1940 |
| 2,313,175 | Scott | Mar. 9, 1943 |
| 2,327,788 | Hickman | Aug. 24, 1943 |
| 2,370,464 | Hickman | Feb. 27, 1945 |
| 2,415,411 | Browman | Feb. 11, 1947 |
| 2,446,997 | Brewer | Aug. 17, 1948 |

FOREIGN PATENTS

| Number | Country | Date |
|---|---|---|
| 434,726 | Great Britain | Sept. 9, 1935 |